United States Patent [19]

Kirk

[11] 4,000,938
[45] Jan. 4, 1977

[54] ROTARY SAFETY REFLECTOR

[76] Inventor: Norbert A. Kirk, 43 E. Ohio St., Room 930, Chicago, Ill. 60611

[22] Filed: Mar. 3, 1975

[21] Appl. No.: 554,627

[52] U.S. Cl. .................................. 350/99; 350/97
[51] Int. Cl.² ........................................ G02B 5/12
[58] Field of Search .......... 350/99, 97; 188/250 D, 188/250 A, 250 E

[56] References Cited

UNITED STATES PATENTS

| | | | |
|---|---|---|---|
| 1,798,052 | 3/1931 | Additon | 350/99 |
| 2,252,056 | 8/1941 | Amundson | 350/99 |
| 2,642,777 | 5/1950 | Bradler | 350/99 |
| 2,645,977 | 7/1953 | Wilford | 350/97 |

Primary Examiner—John K. Corbin
Assistant Examiner—B. Wm. de los Reyes
Attorney, Agent, or Firm—Larson, Taylor and Hinds

[57] ABSTRACT

A rotary safety reflector for mounting on the exhaust pipe of a motor vehicle, comprising a rotatable shaft, means for rotatably mounting the shaft in spaced relation from the outlet of the exhaust pipe such that the axis of the shaft is substantially transverse to the direction of the exhaust flowpath, first and second rearwardly facing reflecting surfaces fixedly mounted at each end of the shaft substantially outboard of the exhaust flowpath, and a fluid motor fixedly mounted on the shaft intermediate the reflecting surfaces and in alignment with the outlet of the exhaust pipe such that the exhaust flow acts upon the fluid motor to cause rotation of the shaft about its axis.

8 Claims, 4 Drawing Figures

ROTARY SAFETY REFLECTOR

BACKGROUND OF THE INVENTION

This invention relates to motor vehicle accessories, and more particularly, to reflective safety devices.

DESCRIPTION OF THE PRIOR ART

In an effort to increase the conspicuousness of motor vehicles during periods of reduced visibility, particularly at night, a number of reflective devices have been developed which are intended to be mounted at various locations on the motor vehicle. Among the types of reflectors developed are those wherein the reflecting surfaces are mounted for rotation and are caused to rotate by the action of the exhaust gases exiting from the motor vehicle's tailpipe. Examples of such prior art reflectors are Amundson, U.S. Pat. No. 2,252,066; and Bradler, U.S. Pat. No. 2,642,777. It is to be noted that this listing is not, nor is it intended to be, exhaustive.

Rotary reflectors of the Bradler type, wherein a plurality of reflecting surfaces are mounted paddlewheel fashion directly in the path of the exhaust gases, suffer the serious disadvantage that the exhaust gases are allowed to act directly on the reflecting surfaces in order to effect their rotation, thereby resulting in the reflecting surfaces being coated with exhaust residues. Rotary reflectors of the Amundson type, wherein a rotary propeller mounted in the path of exhaust gases is coupled through a rearwardly extending shaft to rotate reflector buttons mounted on the end of the shaft, have the disadvantage that an exhaust deflecting plate must be interposed between the reflector buttons and the exhaust gases in order to prevent the reflecting surfaces from becoming coated by exhaust residues. The bulk and complexity of such reflectors is thus greatly increased.

A further disadvantage of both types of rotary reflectors is that their arrangement serves to disrupt substantially the flow of exhaust gases from the exhaust pipe.

SUMMARY OF THE INVENTION

These and other disadvantages of the prior art are overcome by the rotary reflector of the present invention which comprises a rotatable shaft means for rotatably mounting the shaft in spaced relation from the outlet of the exhaust pipe of an internal combustion motor vehicle such that the axis of the shaft is substantially transverse to the direction of exhaust flow, first and second rearwardly-facing reflecting surfaces, one reflecting surface being fixedly mounted at each end of the shaft substantially outboard of the exhaust flow, and a fluid motor fixedly mounted on the shaft intermediate the two reflecting surfaces and in alignment with the outlet of the exhaust pipe such that the exhaust flow acts on the motor to cause rotation of the shaft about its axis. In a preferred embodiment, the size of the fluid motor is such that the motor's surface area is small as compared with the surface area defined by the exhaust pipe outlet and the fluid motor is aligned with respect to the exhaust outlet such that its arc of rotation is completely within the boundary defined by the perimeter of the exhaust outlet. In a preferred embodiment, the fluid motor may comprise a relatively flat, elongated member, the end portions of which are slightly bent or curved in opposite directions with respect to each other. The means for rotatably mounting the shaft on the exhaust pipe may be of any configuration which allows for adjustment to the size of the exhaust pipe. In a preferred embodiment, the reflecting surfaces are designed to give the illusion of flashing lights as they are rotated.

Other features and advantages of the invention will be set forth in, or apparent from, the detailed description of preferred embodiments found herein below.

DETAILED DESCRIPTION

Figure 3:
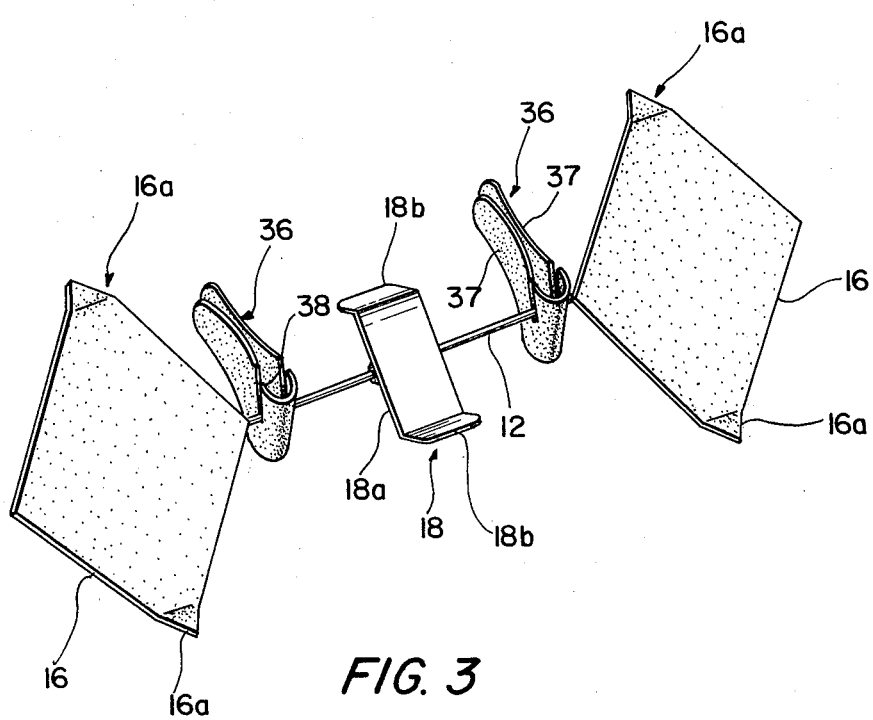

FIG. 3 is a perspective view of the invention with a third embodiment of the mounting means therefor and a second embodiment of the reflecting surfaces therefor. Referring to FIG. 1, the rotary safety reflector device of the present invention is generally denoted 10, and comprises a rotatable shaft 12, a mounting bracket, generally denoted 14, a pair of reflecting surfaces 16, and a fluid motor 18.

Mounting bracket 14 may be of any design whereby shaft 12 may be rotatably mounted therein in spaced relation from the outlet of the exhaust pipe of an internal combustion motor vehicle and such that the axis of shaft 12 is substantially transverse to the direction of exhaust flow from the outlet pipe.

Shaft 12 is of such length that when reflecting surfaces 16 are mounted thereon at each end, and the reflector 10 is mounted on the tailpipe of a motor vehicle, as described herein below, reflecting surfaces 16 are outboard of the path of the exhaust flow from the tailpipe.

Figure 1A:
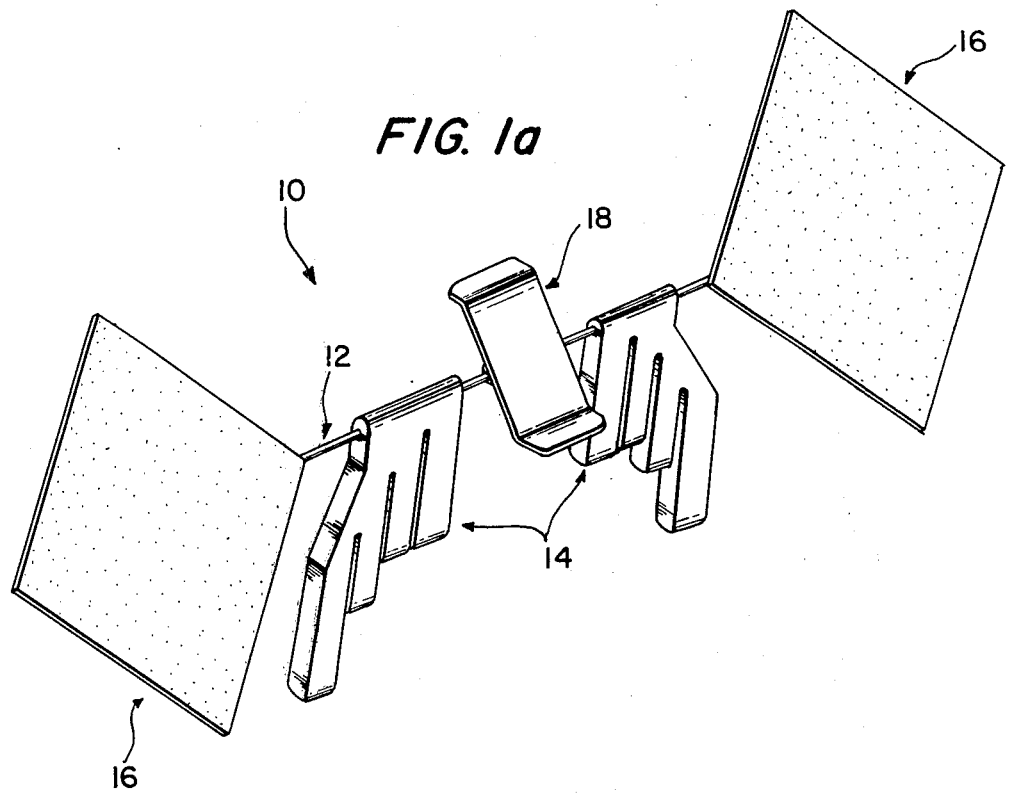
FIG. 1a is a perspective view of the invention with a first embodiment of the mounting means therefor and a first embodiment of the reflecting surfaces therefor.
Figure 1B:
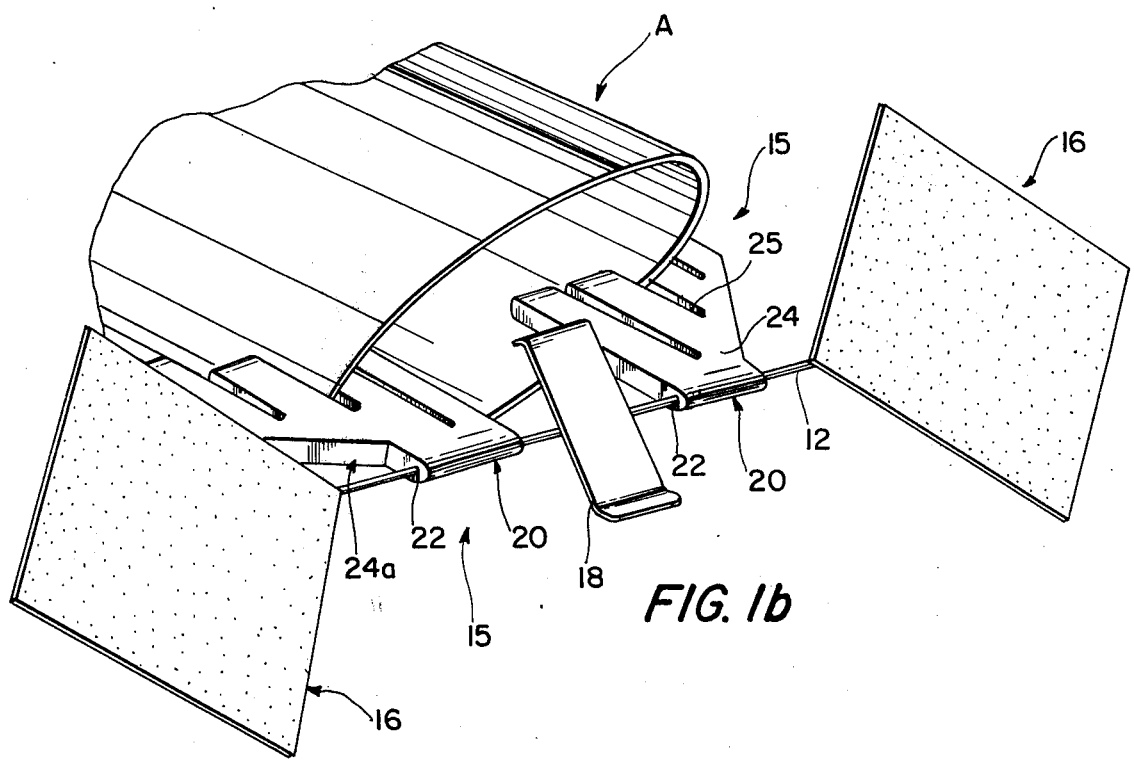
FIG. 1b illustrates the embodiment of FIG. 1a mounted on a motor vehicle tailpipe.
Figure 2:
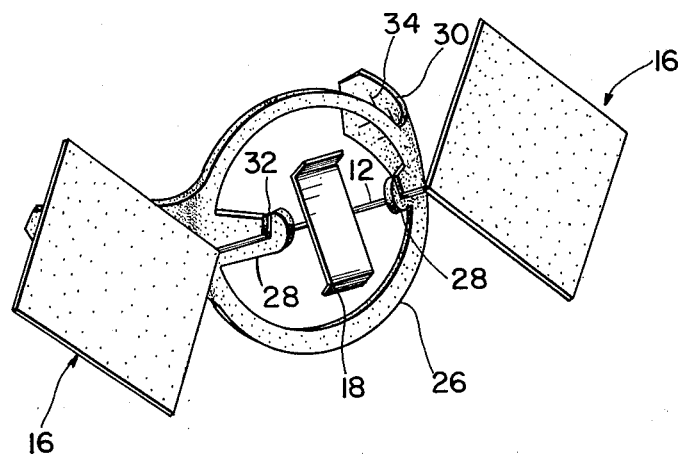
FIG. 2 is a perspective view of the invention with a second embodiment of the mounting means therefor and the first embodiment of the reflecting surfaces therefor.

Several preferred embodiments of bracket 14 are illustrated in FIG. 1–3. Referring to FIGS. 1a and 1b, a first embodiment of bracket 14 comprises a pair of bracket members 15. Each bracket member 15 comprises a base region 20 provided with a mounting arrangement, such as bore 22 extending therethrough, for rotatably and slidably receiving shaft 12, and a slotted region 24 defining a plurality of spaced slots 25. The width of each slot 25 corresponds approximately to the thickness of conventional motor vehicle exhaust pipes to provide secure, yet removable engagement of bracket 15 with the exhaust pipe. The base region 20 may be truncated as shown so that a portion of one edge 24a of bracket 15 tapers from the slotted region 24 to the shortened base region 20.

Shaft 12 is rotatably mounted in the bores 22 of bracket members 15 such that the tapered edge 24a of each bracket member 15 is relatively adjacent the corresponding end of shaft 12. Fluid motor 18 is mounted on the shaft 12 so as to be positioned between the bracket members 15. Reflecting surfaces 16 are mounted on shaft 12 at each end of shaft 12 outboard of bracket members 15. Referring to FIG. 1b, the assembled reflector 10 is mounted on the motor vehicle tailpipe A with the tailpipe A entering a slot 25 on each bracket member 15. The particular slot 25 selected for engagement with the tailpipe A is determined according to the diameter of the tailpipe. The sloped outer edges of bracket members 15 assure that the bracket members 15 do not interfere with rotation of reflecting surfaces 16 when the innermost slots 25 of bracket members 15 are utilized.

Referring to FIG. 2, a second embodiment of bracket 14 comprises a ring-shaped portion 26, two opposed, slotted shaft-supporting arms 28, and two opposed, relatively resilient mounting arms 30. The diameter of ring portion 26 is selected to correspond approximately to the diameter of the tailpipe on which the reflector 10 is to be mounted.

Arms 28 extend outwardly from the plane defined by ring 26 and are slightly inclined toward each other. Each arm 28 has a mounting arrangement, such as slot 32, near its distal end for rotatably receiving shaft 12. Arms 30 extend outwardly from the plane defined by ring 26 in a direction relatively opposed to the direction in which arms 28 extend, as illustrated, and are slightly inclined away from each other in their normal, unflexed state, such that the spacing between arms 30 is slightly greater than the interior diameter of conventional motor vehicle tailpipes on which the reflector 10 is to be mounted. Mounting arms 30 may be provided with a series of projecting surfaces 34 formed by cutting a series of V-shaped slits in the mounting arms 30 and deforming outwardly the resulting V-shaped portions of mounting arms 30, as shown.

Shaft 12 is rotatably mounted in the slots 32 of supporting arms 28 and fluid motor 18 is mounted on shaft 12 so as to be positioned between supporting arms 28. Reflecting surfaces 16 are mounted on shaft 12 at each end thereof outboard of supporting arms 28. Referring to FIG. 2b, the assembled reflector 10 is mounted on a motor vehicle tailpipe A by flexing mounting arms 30 inwardly toward each other and inserting them within the interior of the tailpipe A. Since the mounting arms 30 will remain slightly flexed when they are in engagement with the interior surface of the tailpipe A, the outwardly-directed force thereby produced ensures that the reflector 10 is securely attached to the tailpipe. The projecting surfaces 34 further act to prevent undesired disengagement of the reflector 10 from the tailpipe.

Referring to FIG. 3, a third embodiment of bracket 14 comprises a pair of clips 36. Each clip 36 comprises a pair of arms 37 biased for engagement. Each clip 36 has a mounting arrangement, such as slot 38, at one end for rotatably, and slidably, receiving shaft 12.

Shaft 12 is rotatably mounted in the slots 38 of clips 36 and fluid motor 18 is mounted on shaft 12 so as to be positioned between clips 36. Reflecting surfaces 16 are mounted on shaft 12 at each end thereof outboard of clips 36. Referring to FIG. 3b, the assembled reflector 10 is mounted on a motor vehicle tailpipe with the tailpipe wall entering between the arms 37 of each clip 36.

Reflecting surfaces 16 may be of any desired shape including aerodynamic shapes which enhance rotation when the surfaces 16 are in the path of airflow. A preferred embodiment of such an aerodynamically shaped reflecting surface is shown in FIG. 3a, wherein the tips 16a are slightly bent in relatively opposite directions from each other. In another preferred embodiment of reflecting surfaces 16, reflecting surface 16 has one reflective face and one non-reflective face. Reflecting surfaces 16 are then mounted on the shaft 12 at each end thereof such that they are substantially co-planar, parallel to the axis of shaft 12, and the reflective face of one reflecting surface 16 is directed in the opposite direction from the reflective face of the other reflecting surface 16. As a result, when the reflecting surfaces 16 are rotated, light will be reflected substantially from only one reflecting surface 16 at any one time, and the light reflected from reflector 10 will give the illusion of coming from a pair of flashing lights.

Fluid motor 18 may be of any conventional design. An exemplary embodiment thereof is illustrated in FIG. 3a, and comprises a flat, elongated member 18a whose ends 18b are slightly bent in substantially opposite directions from each other. Fluid motor 18 is mounted on shaft 12 so that when reflector 10 is mounted on the motor vehicle tailpipe, the arc of rotation of motor 18 is completely within the boundary defined by the perimeter of the tailpipe outlet. An important feature of the present invention is that fluid motor 18 may have a small surface area compared with the surface area defined by the tailpipe outlet so as not to disrupt the exhaust flow.

It will be appreciated by those skilled in the art that, although the invention has been described relative to exemplary embodiments thereof, modifications and variations can be effected in these embodiments without departing from the scope and spirit of the invention.

What is claimed is:

1. A rotary safety reflector assembly for mounting on the exhaust pipe of a vehicle powered by an internal combustion engine, the combustion gases exiting from the exhaust pipe in an exhaust flow, said reflector assembly comprising a rotatable shaft, means for rotatably mounting said shaft in spaced relation with respect to the outlet of the exhaust pipe such that the axis of the shaft is substantially transverse to the direction of the exhaust flow, means defining first and second reflecting surfaces fixedly mounted at each end of said shaft for rotation therewith at locations substantially outboard of said exhaust flow on opposite sides thereof, and a fluid motor fixedly mounted on said shaft intermediate said first and second reflecting surfaces and in alignment with the outlet of the exhaust pipe such that said exhaust flow acts upon said fluid motor to cause rotation of said shaft about its axis, said mounting means comprising means for removably mounting said reflector assembly on the exhaust pipe comprising means for detachably engaging the exhaust pipe on opposite edges thereof, said mounting means including at least two resilient mounting arms which biasingly engage said opposite edges of said exhaust pipe so as to mount said assembly on said exhaust pipe.

2. The rotary safety reflector assembly of claim 1 wherein said mounting means comprises means for rotatably receiving said shaft, and means defining a plurality of spaced slots for removably engaging the wall of said exhaust pipe, said plurality of slots allowing said reflector to be mounted on exhaust pipes of varying diameters.

3. The rotary safety reflector assembly of claim 1, wherein said mounting means comprises a pair of bracket members, each bracket member of said pair comprising means for rotatably and slidably receiving said shaft, and means defining a plurality of spaced slots for removably engaging the wall of said exhaust pipe, said means for rotatably and slidably receiving said shaft and said plurality of slots allowing said reflector to be mounted on exhaust pipes of varying diameters.

4. The rotary safety reflector assembly of claim 1 wherein said mounting means comprises means for rotatably receiving said shaft, and a pair of opposed, spaced resilient mounting arms, said mounting arms being inserted into the interior of said exhaust pipe by bending said mounting arms from their normally outwardly-flexed position toward each other, said mounting arms thereby producing an outwardly-directed force to provide secure engagement of said mounting arms with the interior surface of said exhaust pipe.

5. The rotary safety reflector assembly of claim 4 wherein said mounting means are provided with a series of spaced, outwardly projecting surfaces to provide greater resistance to disengagement of said mounting arms from said exhaust pipe.

6. The rotary safety reflector assembly of claim 1 wherein said mounting means comprises means for rotatably and slidably receiving said shaft, and clip means for removably engaging the wall of said exhaust pipe.

7. The rotary safety reflector assembly of claim 1 wherein the surface area of said fluid motor is small compared to the area defined by the outlet of said exhaust pipe, so as to minimize the disruption of the exhaust flow from said exhaust pipe.

8. The rotary safety reflector assembly of claim 7 wherein said fluid motor is aligned with the outlet of said exhaust pipe such that the arc of rotation defined by said fluid motor is completely within said exhaust flow path.

* * * * *